(12) United States Patent
Dingemans et al.

(10) Patent No.: US 9,220,154 B2
(45) Date of Patent: Dec. 22, 2015

(54) LIGHTING SYSTEM AND METHOD FOR CONTROLLING A LIGHTING SYSTEM

(75) Inventors: Antonius Petrus Marinus Dingemans, Eindhoven (NL); Willem Franke Pasveer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 804 days.

(21) Appl. No.: 13/394,341

(22) PCT Filed: Sep. 24, 2010

(86) PCT No.: PCT/IB2010/054311
§ 371 (c)(1),
(2), (4) Date: Mar. 6, 2012

(87) PCT Pub. No.: WO2011/039688
PCT Pub. Date: Apr. 7, 2011

(65) Prior Publication Data
US 2012/0161645 A1    Jun. 28, 2012

(30) Foreign Application Priority Data

Sep. 29, 2009  (EP) .................................... 09171658

(51) Int. Cl.
*H05B 37/02*    (2006.01)
*H05B 39/04*    (2006.01)
*H05B 41/36*    (2006.01)

(52) U.S. Cl.
CPC ........ *H05B 37/0218* (2013.01); *H05B 37/0227* (2013.01); *Y02B 20/46* (2013.01)

(58) Field of Classification Search
USPC .................................................. 315/149–159
See application file for complete search history.

(56) References Cited

U.S. PATENT DOCUMENTS 6,025,679 A * 2/2000 Harper et al. ................. 315/312
2004/0002792 A1  1/2004 Hoffknecht
(Continued)

FOREIGN PATENT DOCUMENTS

JP  2001143877 A  5/2001
JP  2006024542 A  1/2006
(Continued)

*Primary Examiner* — Brandon S Cole
(74) *Attorney, Agent, or Firm* — Meenakshy Chakravorty

(57) ABSTRACT

The present invention refers to a lighting system comprising ambient light sources and task light sources, and occupancy sensors for detecting occupancy in a number of occupancy zones and for controlling the ambient light sources and task light sources. Each occupancy sensor is provided to communicate wirelessly with other occupancy sensors. On the detection of occupancy of at least one zone, the occupancy sensors detecting the occupancy active at least one ambient light source and send a control signal to other occupancy sensors to active other ambient light sources, and the intensity of a group of task light sources illuminating the occupied zone is set to a level higher than the intensity of the remaining task light sources. The invention also refers to a respective method for controlling a lighting system of this kind.

14 Claims, 4 Drawing Sheets

(56) References Cited

U.S. PATENT DOCUMENTS

| | | |
|---|---|---|
| 2006/0091822 A1* | 5/2006 | Bierman et al. ............... 315/244 |
| 2009/0108762 A1 | 4/2009 | Chen |
| 2009/0149973 A1 | 6/2009 | Keller et al. |
| 2009/0236910 A1* | 9/2009 | Yamada et al. ................. 307/40 |
| 2010/0176733 A1* | 7/2010 | King ............................. 315/158 |
| 2010/0244709 A1* | 9/2010 | Steiner et al. ................. 315/158 |
| 2012/0153840 A1* | 6/2012 | Dahlen et al. ................. 315/152 |
| 2013/0038218 A1* | 2/2013 | Xu et al. ........................ 315/151 |
| 2013/0181630 A1* | 7/2013 | Taipale et al. ................. 315/224 |
| 2014/0009069 A1* | 1/2014 | Znamenskiy et al. ........ 315/152 |

FOREIGN PATENT DOCUMENTS

| | | |
|---|---|---|
| JP | 2009004326 A | 1/2009 |
| WO | 2007047419 A2 | 4/2007 |
| WO | 2008135942 A1 | 11/2008 |

* cited by examiner

LIGHTING SYSTEM AND METHOD FOR CONTROLLING A LIGHTING SYSTEM

FIELD OF THE INVENTION

The present invention relates to a lighting system, as well as to a method for controlling a respective lighting system.

BACKGROUND OF THE INVENTION

Lighting systems for room illumination are known in various embodiments. Generally these systems can comprise a large variety of light sources for different purposes. For example ambient light sources are used to provide an ambient lighting for room illumination. In some cases ambient light sources play a significant role for creating a room atmosphere. In working rooms the ambient lighting serves to illuminate the working places on an intermediate intensity level sufficient for general orientation and to provide an overview over the working space.

Additional task light sources are provided to illuminate a predetermined area and to produce a light that is directed to a working surface. The intensity of the task light sources can be varied between a low state and a maximum level. A lighting system comprising ambient light sources and additional task light sources provides a large flexibility to create different lighting situations.

This flexibility is also important in terms of reduction of energy consumption of the lighting system. To reduce the energy consumption, it is desired not to run all light sources of the lighting system at full power, especially in a system which comprises a large number of light sources. It is rather preferred to operate just as many light sources as necessary for an acceptable illumination of a working place, for example, with just as much power as necessary. However, this requirement cannot be fulfilled easily in many situations. In cases where each light source or groups of light sources are provided with switches to operate the respective light sources or groups of light sources individually, the extend of energy consumption depends on the user behavior.

For this reason different approaches have been made to operate the light sources of the lighting system automatically. One way of controlling the light sources is to provide sensors like occupancy sensors which detect the room occupancy and switch the light on or off according to the detected occupancy state. By using occupancy sensors, it is also possible to monitor different zones of one room and to operate the light sources illuminating these zones individually.

However, with increasing complexity of the lighting system, this way of controlling the lighting system reaches its limits. For economic reasons it is unacceptable to provide each light source with an individual occupancy sensor. Simplifying the system by connecting different light sources, such as the ambient light sources, by a wiring to create a network which can be controlled from one single controller leads to high installation costs because of the wiring of the light sources with each other, apart from the fact that the flexibility of the system is reduced in this case.

It is therefore the object of the present invention to create a lighting system of the above kind which can be installed with low installation costs but can be operated with decreased energy consumption, keeping the flexibility of the lighting system at a high level so that the system can automatically react to different lighting situation depending on the needs of the user. Another object is the provision of a method for controlling such a lighting system.

SUMMARY OF THE INVENTION

These objects are achieved by a lighting system comprising the features of claim 1, as well as by a method comprising the features of claim 10.

A lighting system according to the present invention comprises ambient light sources as well as task light sources to illuminate a predetermined area, like a working place, for example, with variable intensity. A plurality of occupancy sensors is provided for detecting occupancy in a number of occupancy zones. The ambient light sources and the task light sources are controlled by the occupancy sensors. Moreover, each occupancy sensor is provided to communicate wirelessly with other sensors.

When occupancy of one or more zones is detected by one or more occupancy sensors, the occupancy sensors which detect the occupancy activate the light sources which are controlled by the respective occupancy sensors directly. Moreover, a control signal is send to other occupancy sensors, so that other ambient light sources, which are controlled by other occupancy sensors, can be activated. This means that not only the ambient light source is activated which is controlled by the occupancy sensor which detects the occupancy in its zone, but also other ambient light sources are activated which receive a "wake up" signal for activation. It is, for example, possible to activate all ambient light sources in one room when a person enters the room and reaches a zone which is controlled by one occupancy sensor. This sensor can then activate one ambient light source that is controlled by this sensor directly, and broadcast the control signal to other occupancy sensors, which respond by activating their allocated ambient light sources. As a result, the whole room can be illuminated by the ambient light sources at a certain illumination level.

Moreover, the intensity of a group of task light sources illuminating the occupied zone is set to a level higher than the intensity of the remaining task light sources where no occupancy is detected. For example, when the person who enters the room stays within one zone, the occupancy sensor which monitors this zone sets the task light source illuminating this zone to a high level, which can be a maximum illumination level. The remaining task light sources which do not illuminate the occupied zone stay dark or on a low level. By setting the illumination of the occupied zone on a high level, it is provided that the area in which the person is located is illuminated sufficiently to provide a working light.

It is essential that not all task lights will be operated to provide a working light, but only the task light or plural task lights are selected to illuminate the occupied zone selectively. This can reduce the energy costs dramatically. At the same time, the ambient lighting is kept on a certain level, as described above.

When the person moves through the room, she or he leaves and enters one zone after the other so that the members belonging to the group of task light sources illuminating the zone that is actually occupied changes. Following the person through the room, the group of task light sources "shifts" through the room. It is noted that a group of task light sources can comprise any number of task light sources, beginning from one single task light source illuminating the occupied zone, up a plurality of task light sources illuminating the occupied zone at the same time.

This lighting system offers the possibility to operate a large number of ambient light sources by wireless communication without the necessity of a wiring between the different ambient light sources, saving installation costs. On the other hand, the system stays very flexible as far as its installation and operation are concerned. The lighting system according to the present invention can react to different room occupancy situations to create different lighting settings automatically, saving energy costs.

Preferably the intensity of task light sources surrounding the group of task light sources illuminating the occupied zone is set to an intermediate intensity lower than the intensity of the group of task light sources illuminating the occupied zone.

In this embodiment, the immediate surrounding of the zone where a person is located is also illuminated, but on a comparatively low level with respect to the task light sources within the group which is operated at a high intensity level.

According to a preferred embodiment of the present invention, the occupancy sensors are provided with time measuring devices for determining the occupation time of the respective occupied zones.

This provides to option to decide whether the occupation time exceeds a predetermined time level. For example, the group of task light sources illuminating the occupied zone is only set to a high level when the person stays within the occupied zone for a longer time. By this arrangement it is not necessary to activate task light sources to illuminate zones which are crossed by a person on her or his way from one working zone to another, and only the zones are illuminated where the person stays for a longer occupation time. The predetermined time level which has to be exceeded to activate the group of task light sources to illuminate the occupied zone can be set at any desired value.

According to another preferred embodiment, the lighting system according to the present invention comprises a plurality of luminaires, each luminaire comprising a set of light sources comprising ambient light sources and task light sources, and at least one occupancy sensor for controlling said set of light sources.

Preferably each of these luminaires is connectable to a second luminaire to be supplied with power via this second luminaire.

For example, it is possible that only one luminaire is directly connected to a mains supply, while the other luminaires are connected to this luminaire to be supplied with power. The wiring scheme of the luminaires for power supply can be flexible, independent from the control of the luminaires, to provide an easy installation.

In another embodiment, the occupancy sensors are provided as passive infrared sensors, ultrasonic movement sensors or a combination of both.

Preferably the occupancy sensors are provided with an alarm device to produce an occupancy alarm signal in case of detection of occupancy of at least one zone.

In this embodiment the occupancy sensors are also used for producing an intrusion alarm, like a burglar alarm.

According to another embodiment, the occupancy sensors are provided with an alarm device to produce a fire alarm signal in case of detection of fire in at least one zone.

According to the present invention, a method for controlling a lighting system is provided, said lighting system comprising a plurality of ambient light sources for providing an ambient lighting, a plurality of task light sources, each task light source being provided to illuminate a predetermined area with variable intensity, and a plurality of occupancy sensors for detecting occupancy in a number of occupancy zones and for controlling said ambient light sources and task light sources, each occupancy sensor being provided to communicate wirelessly with other occupancy sensors, said method comprising monitoring a number of occupancy zones for occupancy detection, and in case of the detection of occupancy of at least one zone: activating at least one ambient light source by means of the respective occupancy sensor controlling said at least one ambient light source; sending a control signal from the respective occupancy sensor to other occupancy sensors to activate other ambient light sources; and setting the intensity of a group of task light sources illuminating the occupied zone to a level higher than the intensity of the remaining task light sources.

A preferred embodiment of the method according to the present invention comprises setting the intensity of task light sources surrounding said group of task light sources to an intermediate intensity lower than the intensity of the group of task light sources illuminating the occupied zone.

According to another preferred embodiment, said method comprises determining the occupation time of the at least one zone in which an occupancy is detected, and the step of setting the intensity of said group of task light sources illuminating the occupied zone to a level higher than the intensity of the remaining task light sources is only performed in case the occupation time exceeds a predetermined level.

Preferably each occupancy sensor controls one set of light sources, each set of light sources comprising at least one ambient light source and at least one task light source, said method further comprising supplying a plurality of occupancy sensors and the sets of light sources controlled by these occupancy sensors by a common power supply.

According to a preferred embodiment, the method according to the present invention comprises producing an occupancy alarm signal in case of detection of occupancy of at least one zone.

According to another preferred embodiment, the method according to the present invention comprises monitoring a number of occupancy zones for fire detection, and producing a fire alarm signal in case of detection of fire in at least one zone.

Further aspects and benefits of the present invention will become apparent from the detailed description provided hereinafter. It should be understood that the detailed description and specific examples, while indicating exemplary embodiments of the invention are intended for purposes of illustration only and are not intended to limit the scope of the invention.

BRIEF DESCRIPTION OF THE DRAWINGS

The above mentioned features, aspects and advantages of the present invention will become better understood from the following description with reference to the accompanying drawings where.

DETAILED DESCRIPTION OF EMBODIMENTS

Figure 1:
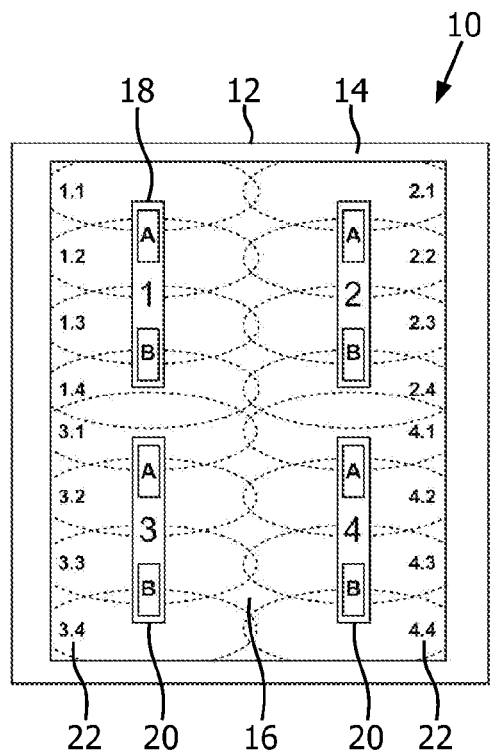
FIG. 1 is a schematic view of one embodiment of the lighting system according to the present invention, indicating the monitored occupancy zones.

The lighting system 10 in FIG. 1 is installed in a room 12 delimited by four walls, one of these walls being indicated exemplary by reference number 14. The perspective in FIG. 1 is a view from above, showing the rectangular floor 16 of the room 12 being surrounded by the walls 14. The room 12 is illuminated by a plurality of light sources comprised in the lighting system 10, as will be described in the following.

The lighting system 10 comprises a plurality of ambient light sources, which are not shown explicitly in the Figures. The ambient light sources are provided to create an ambient lighting which, in operation, illuminates the room 12 on an intermediate illumination level. This ambient illumination level is sufficient to enable a person to move through the room, to identify objects and obstacles, etc. However, the illumination level of the ambient light sources is not sufficient as a working light, to enable a person to carry out a working process. For example, the room 12 may be a pack office which is generally illuminated when a person enters a room. Different working areas, i.e. packing stations within the room 12 shall be illuminated at a higher level.

For illuminating predetermined working areas a number of task light sources is provided. In FIG. 1, eight identical task light sources 18 are shown schematically, being additionally provided with reference letters A and B. Each position of the task light sources 18 corresponds to one working place, which can be illuminated by the respective task light source 18.

The task light sources 18 as well as the ambient light sources are comprised in luminaires 20 which are mounted on the ceiling of the room 12. Each of the four luminaires 20 shown in FIG. 1 comprises two task light sources 18, individually marked as A and B and ambient light sources (not shown). All light sources comprised in one luminaire 20, including the task light sources A and B and the ambient light sources, will be referred to as one set of light sources in the following. Each set of light sources comprised in one luminaire 20 is controlled by an occupancy sensor provided in the luminaire 20.

The occupancy sensor is provided for detecting room occupancy in a number of different occupancy zones 22 located under the respective luminaire 20. In the embodiment shown in FIG. 1, each occupancy sensor in one luminaire 20 is able to detect occupancy in four different zones. For explanatory reasons each luminaire 20 is marked by an ordinal number from 1 to 4. A luminaire 20 in the upper left area of FIG. 1 is marked by ordinal number 1, the upper right luminaire 20 is marked by ordinal number 2, the lower left luminaire 20 is marked by ordinal number 3, and the remaining lower right luminaire 20 is marked by ordinal number 4. The task lights 18 comprised in the luminaires 20 will be referred to as respective task lights 1A, 1B, 2A, 2B and so on. The occupancy zones 22 monitored by the occupancy sensors in the luminaires 20 are marked by a combination of two ordinal numbers. For example, the first zone monitored by the occupancy sensor 20 marked by ordinal number 1, corresponding to the upper left corner of the room 12 (marking the entrance area), is marked by 1.1. The following zone under this topmost zone 1.1 is marked by 1.2, and so on. That is, the first of these ordinal numbers marking the zones 22 corresponds to the ordinal number of the respective luminaire 20, and the second ordinal number marking the zone 22 corresponds to the number of the zones (from 1 to 4) allocated to this luminaire 20.

In FIG. 1, the zones 22, marked by 1.1 to 4.4 are indicated by elliptic lines. It can be taken from FIG. 1 that adjacent zones 22 can overlap. For example, there is an overlapping area between zones 1.1 and 1.2, as well as between zones 1.1 and 2.1, i.e. zones 22 belonging to different luminaires 20.

In the following, the function of the occupancy sensor controlling the set of light sources comprised in the luminaires 20 will be described.

Figure 2:
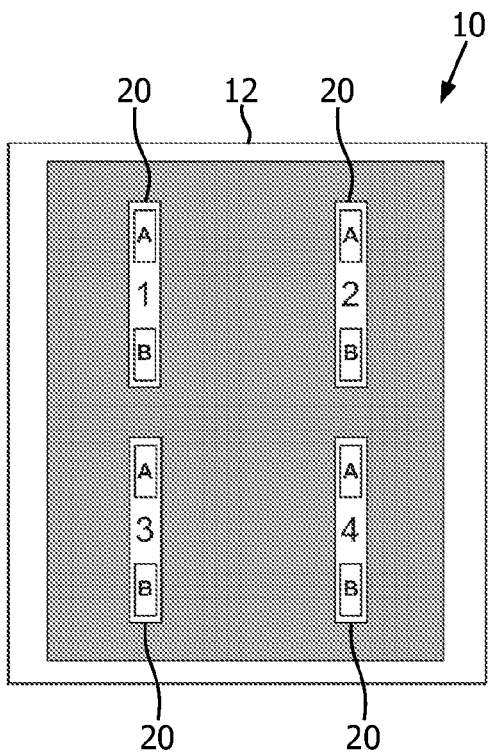
FIG. 2 is another schematic view of the lighting system of FIG. 1, indicating the lighting situation.

When none of the zones 1.1 to 4.4 in the room 12 is occupied, the occupancy sensors comprised in the luminaires 20 keep the complete sets of light sources in a turned-off state. Consequently all luminaires 20 in the room 12 are dark, as indicated in FIG. 2.

Figure 3:
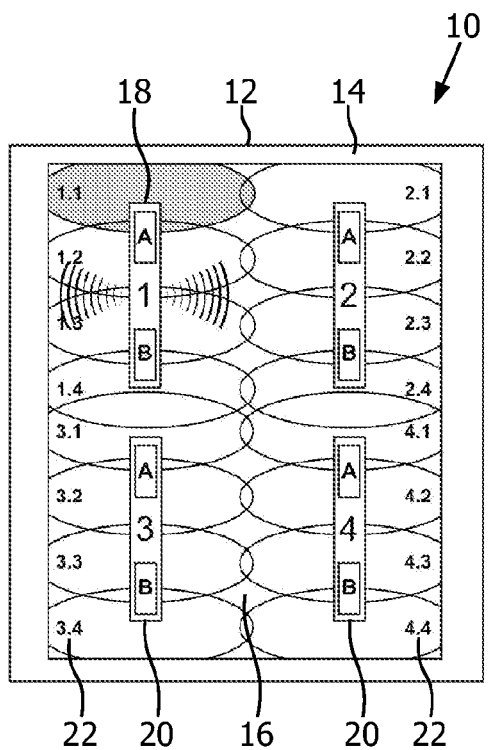
FIG. 3 is a schematic view of the embodiment of the lighting system shown in FIGS. 1 and 2, indicating the occupancy zones in a first occupancy situation.

When a person enters the room through an entrance in the upper left corner of the room 12, this person occupies the zone 22 marked by 1.1. This occupancy is indicated in FIG. 3. On the detection of occupancy of this zone 1.1, the occupancy sensor in the luminaire 20 marked by 1 activates the ambient light sources comprised in this luminaire 1. The term "activation" shall denote the setting of the ambient light sources to a predetermined ambient lighting level, illuminating the surrounding of the upper left luminaire 1 on an intermediate intensity level. For example, this intensity level can be about 300 lux. It is noted that the occupancy sensor controls the ambient light sources comprised in its respective luminaire 20 directly by a respective wiring or circuitry to provide that the ambient light sources to be controlled are supplied by a corresponding energy supply.

Apart from controlling the ambient light sources comprised in the luminaire 20 wherein the occupancy sensor is located which detects the occupancy, this occupancy sensor communicates wirelessly with the other occupancy sensors in the other luminaires 20, which do not detect an occupancy in any of their monitored zones 22. For example, the occupancy sensor comprised in the luminaire 20 marked by ordinal number 1 communicates with the other three occupancy sensors in the remaining luminaires 20 marked by ordinal numbers 2, 3 and 4. To enable this wireless communication, each luminare 20 can be provided with a transmitter device and a respective receiver device so that each occupancy sensor is able to transmit and to receive control signals.

In the case of FIG. 3, the occupancy sensor of the upper left luminaire marked by 1 sends a wireless control signal to the other occupancy sensors in the remaining luminaires marked by 2, 3 and 4. On receiving this control signals, the remaining occupancy sensors in the respective luminaires 20 activate the ambient light sources comprised in the respective other luminaires 20 marked by ordinal numbers 2, 3 and 4. The result is that all ambient light sources comprised in the lighting system 10 illuminating the room 12 are operated. The present example shows that it is sufficient to occupy one zone by a person to activate all ambient light sources in the room 12.

Figure 4:
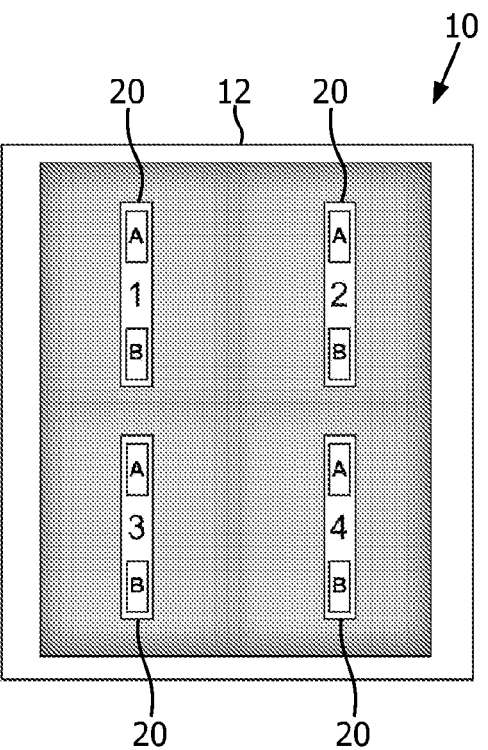
FIG. 4 is a schematic view of the situation of the embodiment of the lighting system according to FIG. 3, indicating the resulting lighting situation.

FIG. 4 shows the resulting lighting situation, wherein the ambient light sources of the luminaires 20 marked by ordinal numbers 1 to 4 are activated. It is noted that in this situation, when the person has just entered the room 12, no task light 18 is operated. The operation of task lights 18 will only take place when at least one zone is occupied for a longer delay time which will also be denoted as occupation time in the following. Such a situation will be described in connection with FIGS. 5 and 6.

Figure 5:
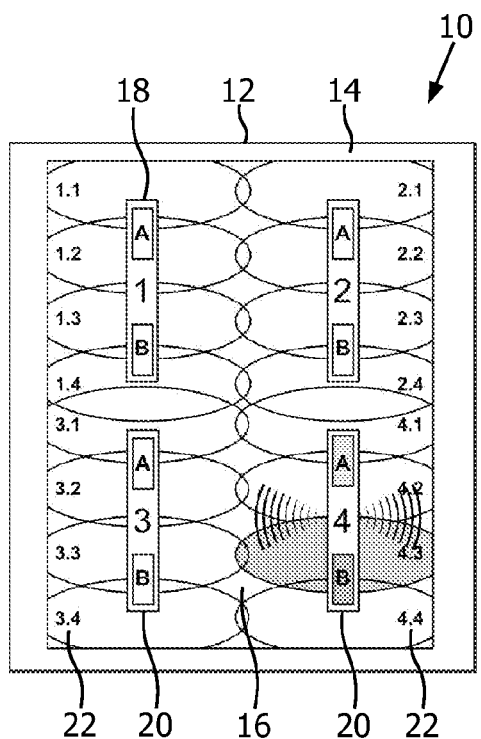
FIG. 5 is a schematic view of the foregoing embodiment of the lighting system, indicating a different occupancy situation than in FIGS. 3 and 4.

In FIG. 5 it is assumed that the person which has entered the zone marked by 1.1 in FIG. 3 has crossed the room to reach a zone marked by 4.3 in the lower right area of the room 12, and stays in this zone 4.3 to carry out working operations there. For these working operations a task light is necessary, as the ambient light is found to be insufficient to provide a working light. This task light is provided by the lower right task light source 18 marked by 4B, which illuminates the respective occupied zone 4.3. In this embodiment, the occupancy sensor of the lower right luminaire 20 marked by ordinal number 4 is activated on the detection of occupancy in zone 4.3, and this occupancy sensor controls task light source 4B to be illuminated at a predetermined intensity level. This intensity level can correspond to the maximum intensity level of this task light 4B, for example, 500 lux corresponding to 100% of the overall power of this task light 4B.

The task light source 4B illuminating occupancy zone 4.3 is only activated to be set on a high intensity level in a case where the occupancy time of zone 4.3 is longer than a predetermined value. This value can be chosen to be set at any level, i.e. a few seconds. This is the reason why not all task light sources illuminating the zones lying between the starting zone 1.1 and the final zone 4.3 are activated when the person walks through the room 12 and crosses these zones, as the occupation time of these crossed zones, for example, zone 1.4 or 2.4, does not exceed the predetermined level so that the respective task light sources 1B and 2B illuminating these zones 1.4 and 2.4 are not activated. The aim is just to activate the task light sources which illuminate a zone where the person stays for a longer time, instead of activating more task light sources. This leads to an energy saving effect.

Additional to setting the task light sources illuminating the occupied zone on a high level, the task light sources surrounding these task light sources can be set on an intermediate intensity level which is lower than the level of the task light sources illuminating the occupied zone. In the example of FIG. 5, the adjacent task light source 18 marked by 4A, also belonging to the lower right luminaire 20, is set to a level of 75% of its maximum intensity, which is lower than the 100% intensity of the task light source 4B illuminating zone 4.3. This leads to the effect that the immediate surrounding of the working place where the person stays at is illuminated on an intermediate level. It could also be acknowledged to activate other surrounding task light sources, like the task light sources 3A and 3B being comprised in the lower left luminaire 20 marked by ordinal number 3, to be set to an intermediate intensity like the task light source 4A.

Figure 6:
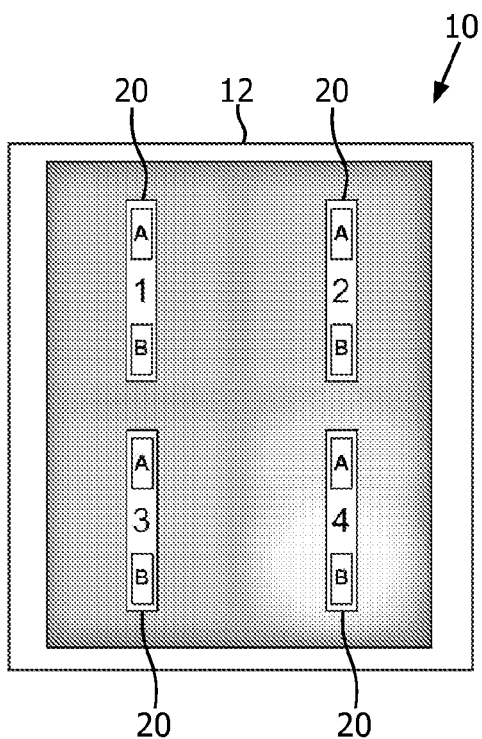
FIG. 6 shows the embodiment of the lighting system in the situation according to FIG. 5, indicating the resulting lighting situation.

FIG. 6 demonstrates the resulting lighting situation corresponding to occupancy situation described in connection with FIG. 5. It is indicated that the task light source 4B is set to 100% intensity, while the adjacent task light source 4A is set to 75% of its maximum power. The other task light sources 1A to 3B are turned off completely.

Figure 7:
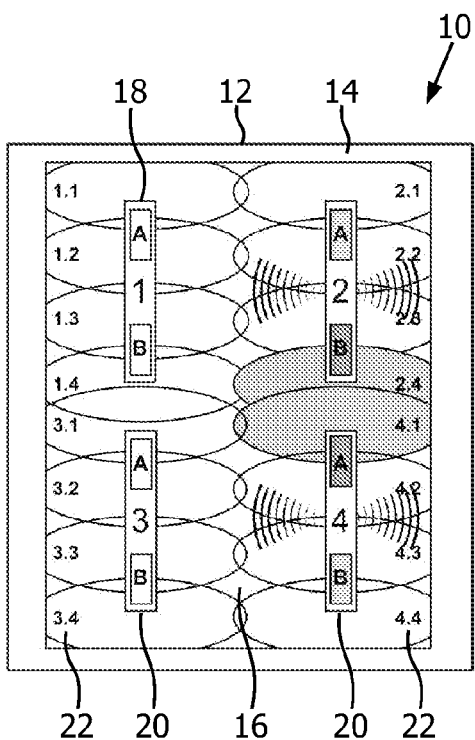
FIG. 7 is a schematic view of the embodiment of the lighting system as described in the foregoing figures, indicating another occupancy situation.
Figure 8:
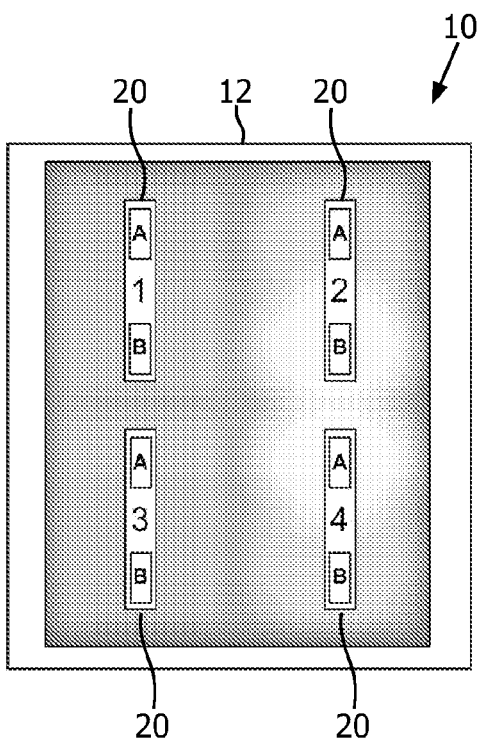
FIG. 8 shows the lighting system in the occupancy situation according to FIG. 7, showing the resulting lighting situation.

FIGS. 5 and 6 represent one example in which one zone is occupied, leading to an activation of one task light source 18 illuminating this occupied zone to be set to a level higher than the intensity of the remaining task light sources 18 belonging to occupancy sensors where no occupancy is detected. However, the present invention is not limited to the activation of one task light source illuminating the occupied zone, but also refers to setting the intensity of a group of task light sources illuminating the occupied zone, said group comprising any number of task light sources, beginning from only one task light source 18 being comprised in this group. It is, for example, possible that two task light sources 18 illuminate the same occupied zone. In this case both task light sources would be set to a level higher than the intensity of the remaining task light sources. The situation described in the following in connection with FIGS. 7 and 8 shows a case wherein two zones marked by 2.4 and 4.1 in FIG. 7 are occupied by two persons for a time longer than the occupation time of these zones. As zone 4.1 is illuminated by task light source 4A and zone 2.4 is illuminated by task light source 2B, both task light sources 2B and 4A form a group of task light sources which are set to a level higher than the intensity of the remaining task light sources, namely to 100% of their maximum power, corresponding to task light source 4B in FIGS. 5 and 6. This leads to a full illumination of the zones 2.4 and 4.1 wherein the persons are located. The adjacent task light sources 2A and 4B are set to a level of 50% of their maximum intensity value in this case, which is lower than the maximum intensity of 100% of the task light sources 2B and 4A but higher than the zero intensity of the remaining task light sources of the luminaires 20 marked by ordinal numbers 1 and 3 on the left side in FIG. 7 which keep being turned off.

The choice of the illumination level of the adjacent light sources can depend on the number of task light sources running at 100% intensity. In the example described in FIG. 7 and FIG. 8, the intensity level of the adjacent light sources 2A and 4B is set to a lower level than the task light source 4A in FIG. 5 and FIG. 6, because in FIG. 7 and FIG. 8, two task light sources 2B and 4A run at their maximum power.

It is obvious that the proposed lighting system 10 according to the present invention can be operated with reduced power consumption, as will be demonstrated in the following calculation. Assumed that the overall ambient lighting is 300 lux, corresponding to 60% of the installed ambient light power, and the maximum intensity level of the task lighting is 500 lux (100% of installed task light power), the power reduction in the situation described in connection with FIGS. 5 and 6 is expressed by the following equation (1):

$$1-(0.60+((100+75)/800)*0.40)=1-0.69=31\% \tag{1}$$

In the situation described in connection with FIGS. 7 and 8, the power reduction factor is calculated by the following equation (2):

$$1-(0.60+((100+100+50+50)/800)*0.40)=1-0.75=25\% \tag{2}$$

It is understood that the above calculation is simplified in some respect and only serves to demonstrate the effect of the present invention.

It is possible to interconnect different luminaires 20 with each other so that different flexible wiring schemes for power supply are possible. In a preferred embodiment, each luminaire is connectable to a second luminaire to be supplied with power via this second luminaire. For example, only one luminaire is connected to a mains supply directly, while other luminaires, which are connected to this luminaire, are supplied indirectly via the first luminaire. Different situations are shown in FIGS. 9 to 12.

Figure 9:
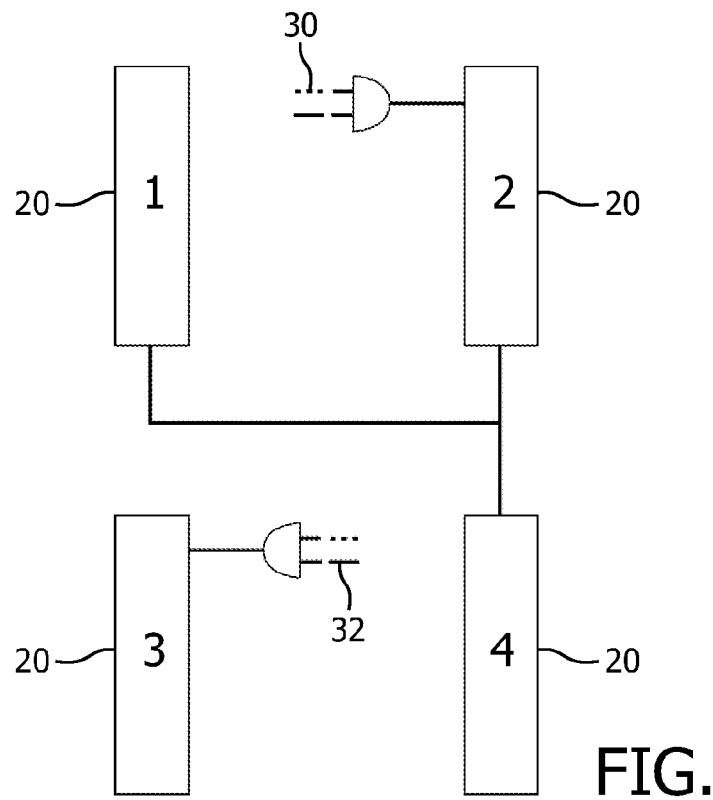
FIGS. 9 to 12 are wiring schemes of different embodiment of the lighting system according to the present invention.
Figure 10:
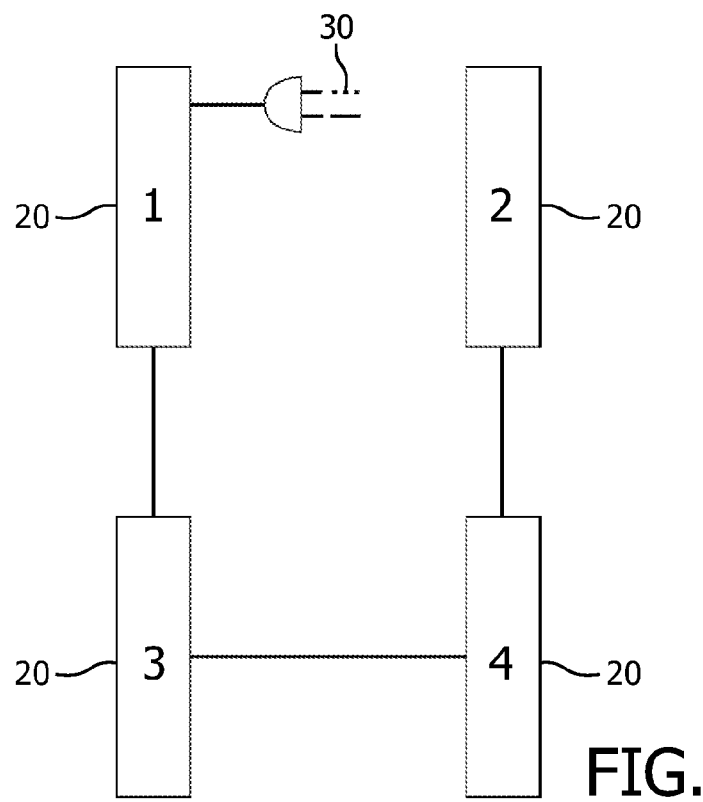

In FIG. 9, only the upper right luminaire 20 marked by ordinal number 2 and the lower left luminaire marked by ordinal number 3 are directly connected with a respective main supply 30, 32. The remaining luminaires 1 and 4 are connected with luminaire 2 by a wiring to be supplied by main supply 30 via luminaire 2. In FIG. 10, only one main supply 30 is provided to supply the upper left luminaire with ordinal number 1 directly. The remaining luminaires 2 to 4 are connected with this luminaire 1 via a wiring. That is, luminaire 2 is connected to luminaire 4, and luminaire 4 is connected to luminaire 3 which is in turn connected directly with luminaire 1 via a wiring.

Figure 11:
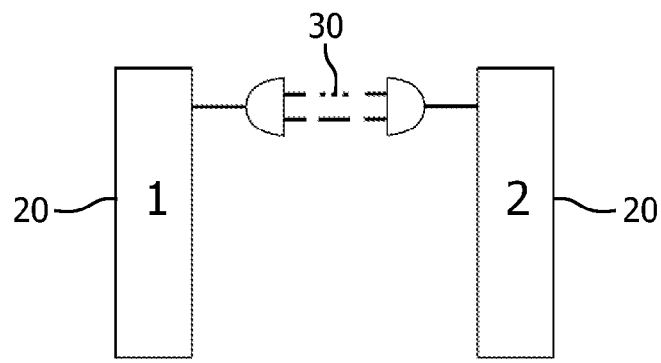
Figure 11:
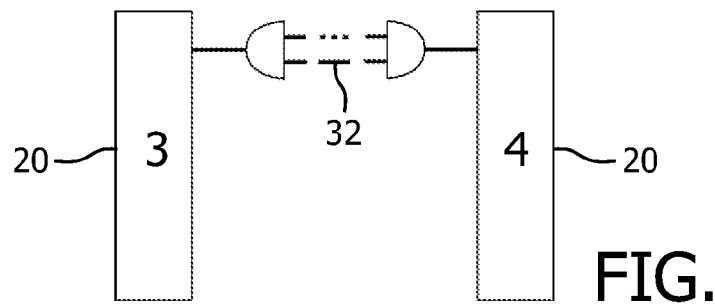
Figure 12:
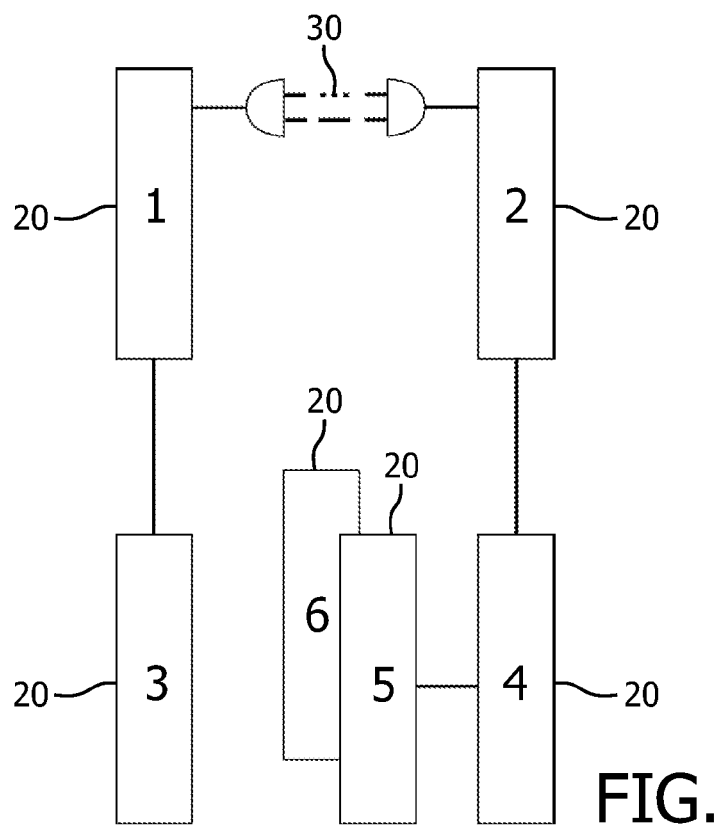

In FIG. 11, a situation is demonstrated where each luminaire 20 from 1 to 4 is connected to a power supply 30,32. In the situation in FIG. 12, the upper luminaires with ordinal numbers 1 and 2 are connected with the main supply 30, while the lower left luminaire 3 is connected to luminaire 1 via a wiring, and luminaire 4 is connected to luminaire 2 via a wiring. The lighting system in FIG. 12 comprises fifth and sixth luminaires 20 marked by ordinal numbers 5 and 6, being connected directly with each other and connected to luminaire 4 via a wiring.

The occupancy sensors used within the proposed lighting system 10 can be provided as passive infrared sensors, ultrasonic movement sensors or a combination of both. Other embodiments of occupancy sensors, like radar sensors, are possible. Moreover, the occupancy sensors can be provided with an alarm device to produce an occupancy alarm signal, like an acoustic or optic signal, in case of detection of occupancy of at least one zone. It is further possible to provide each occupancy sensor with a transmission means for transmitting a wireless alarm signal to any receiving device receiving an occupancy alarm.

It is further possible to provide each occupancy sensor with a fire alarm device to produce a fire alarm signal in case of detection of fire in at least one zone. It is therefore obvious that common embodiments of occupancy sensors can be used within the lighting system according to the present invention, and the lighting system 10 can also fulfil other requirements, like occupancy detection or fire detection supplementing the control function of the light sources comprised within the lighting system.

Any occupancy alarm function or fire alarm function, as described above, can be integrated in the functionality of the sensor itself. With respect to the production of an alarm signal, the wireless communication between the sensors can be used to "spread" an alarm signal of a sensor that detects an occupancy or fire in its monitored zones. Each sensor can be provided to send an alarm signal to other sensors, which then in turn produce an alarm signal to be sent to other sensors, etc. In this embodiment, each occupancy sensor is provided not only to send an alarm signal to other occupancy sensors but also to produce an alarm signal in case of reception of an alarm signal by another occupancy sensor.

The above description is intended to be nearly illustrative to the present invention and should not be construed as limiting the attended claims to any particular embodiment or a group of embodiments. While the invention has been described in detail with reference to specific exemplary embodiments thereof, different modifications and changes can be made thereto without departing from the spirit and the scope of the invention as set forth in the claims. This specification and drawings are accordingly to be regarded to be in an illustrative manner and are not intended to limit the scope of the claims. In the claims the word "comprising" does not exclude other elements or steps, and the indefinite article "a" or "an" does not exclude a plurality. Any reference signs in the claims should not be construed as limiting the scope.

The invention claimed is:

1. Lighting system, comprising:
   a plurality of ambient light sources for providing an ambient lighting,
   a plurality of task light sources, each task light source being provided to illuminate a predetermined area with variable intensity, and
   a plurality of occupancy sensors for detecting occupancy in a number of occupancy zones and for controlling said ambient light sources and task light sources, each occupancy sensor being provided to communicate wirelessly with other occupancy sensors,
   wherein on the detection of occupancy of at least one zone, the occupancy sensors detecting the occupancy activate at least one ambient light source and send a control signal to other occupancy sensors to activate other ambient light sources, and the intensity of a group of task light sources illuminating the occupied zone is set to a level higher than the intensity of the remaining task light sources.

2. Lighting system according to claim 1, wherein the intensity of task light sources surrounding said group of task light sources is set to an intermediate intensity lower than the intensity of the group of task light sources illuminating the occupied zone.

3. Lighting system according to claim 2, comprising a plurality of luminaires, each luminaire comprising a set of light sources comprising ambient light sources and task light sources, and at least one occupancy sensor for controlling said set of light sources.

4. Lighting system according to claim 3, wherein each one luminaire is connectable to a second luminaire to be supplied with power via this second luminaire.

5. Lighting system according to claim 1, wherein the occupancy sensors are provided with time measuring devices for determining the occupation time of the respective occupied zones.

6. Lighting system according to claim 1, wherein said occupancy sensors are provided as passive infrared sensors, ultrasonic movement sensors or a combination of passive infrared sensors and ultrasonic movement sensors.

7. Lighting system according to claim 1, wherein said occupancy sensors are provided with an alarm device to produce an occupancy alarm signal in case of detection of occupancy of at least one zone or fire alarm signal in case of detection of fire in the at least one zone.

8. Lighting system according to claim 7, wherein said occupancy sensors are provided to send an alarm signal to other occupancy sensors and to produce an alarm signal in case of reception of an alarm signal by another occupancy sensor.

9. Method for controlling a lighting system comprising a plurality of ambient light source for providing an ambient lighting, a plurality of task light sources (18), each task light source being provided to illuminate a predetermined area with variable intensity, and a plurality of occupancy sensors for detecting occupancy in a number of occupancy zones and for controlling said ambient light sources and task light sources, each occupancy sensor being provided to communicate wirelessly with other occupancy sensors, said method comprising:
   monitoring a number of occupancy zones for occupancy detection, and in case of the detection of occupancy of at least one zone:
   a) activating at least one ambient light source by means of the respective occupancy sensor controlling said at least one ambient light source,
   b) sending a control signal from respective occupancy sensor to other occupancy sensors to activate other ambient light sources, and
   c) setting the intensity of a group of task light sources illuminating the occupied zone to a level higher than the intensity of the remaining task light sources.

10. Method according to claim 9, comprising setting the intensity of task light sources surrounding said group of task light sources to an intermediate intensity lower than the intensity of the group of task light sources illuminating the occupied zone.

11. Method according to claim 10, wherein each occupancy sensor controls one set of light sources, each set of light sources comprising at least one ambient light source and at least one task light source,
  said method comprising supplying a plurality of occupancy sensors and the sets of light sources controlled by these occupancy sensors by a common power supply.

12. Method according to claim 9, said method comprising:
  determining the occupation time of the at least one zone in which an occupancy is detected, and performing at least step c) only in case the occupation time exceeds a predetermined level.

13. Method according to claim 9, said method comprising producing an occupancy alarm signal in case of detection of occupancy of at least one zone.

14. Method according to claim 9, said method comprising monitoring a number of occupancy zones for fire detection, and producing a fire alarm signal in case of detection of fire in at least one zone.

* * * * *